(12) United States Patent
Du et al.

(10) Patent No.: US 11,091,042 B2
(45) Date of Patent: Aug. 17, 2021

(54) ELECTRIC VEHICLE DRIVE SYSTEM, BACKUP POWER SUPPLY DEVICE AND METHOD THEREFOR

(71) Applicant: SUNGROW POWER SUPPLY CO., LTD., Anhui (CN)

(72) Inventors: Enli Du, Anhui (CN); Guoqing Cai, Anhui (CN); Wenjie Chen, Anhui (CN)

(73) Assignee: SUNGROW POWER SUPPLY CO., LTD., Hefei Anhui (CN)

( * ) Notice: Subject to any disclaimer, the term of this patent is extended or adjusted under 35 U.S.C. 154(b) by 0 days.

(21) Appl. No.: 16/794,687

(22) Filed: Feb. 19, 2020

(65) Prior Publication Data

US 2020/0398680 A1 Dec. 24, 2020

(30) Foreign Application Priority Data

Jun. 21, 2019 (CN) .......................... 201910546256.5

(51) Int. Cl.
*B60L 50/60* (2019.01)
*B60L 58/10* (2019.01)
*H02P 27/06* (2006.01)

(52) U.S. Cl.
CPC ............. *B60L 50/66* (2019.02); *B60L 58/10* (2019.02); *H02P 27/06* (2013.01)

(58) Field of Classification Search
CPC ........... B60L 50/66; B60L 58/10; H02P 27/06
See application file for complete search history.

(56) References Cited

U.S. PATENT DOCUMENTS

| | | | |
|---|---|---|---|
| 5,796,175 A * | 8/1998 | Itoh | H02J 9/06 307/10.1 |
| 2007/0182348 A1 | 8/2007 | Ooishi et al. | |
| 2016/0026205 A1* | 1/2016 | Song | G05F 3/08 323/313 |
| 2019/0168632 A1* | 6/2019 | Deng | B60L 50/64 |
| 2019/0190294 A1 | 6/2019 | Sato et al. | |

FOREIGN PATENT DOCUMENTS

| | | |
|---|---|---|
| CN | 101867220 A | 10/2010 |
| CN | 105634370 A | 6/2016 |
| CN | 107634578 A | 1/2018 |

(Continued)

OTHER PUBLICATIONS

The Extended European Search Report for corresponding EP Application No. 20155621.4; dated May 20, 2020.

(Continued)

*Primary Examiner* — Jared Fureman
*Assistant Examiner* — Duc M Pham
(74) *Attorney, Agent, or Firm* — Cantor Colburn LLP

(57) ABSTRACT

An electric vehicle drive system, a backup power supply device and a backup power supply method for an electric vehicle drive system are provided. The method includes: converting a voltage on a high voltage DC bus of an electric vehicle into a backup input voltage; determining whether a low voltage battery in the electric vehicle drive system has power supply abnormity; and determining the backup input voltage to be an input voltage of a low voltage power supply circuit in the electric vehicle drive system, in a case that the low voltage battery has power supply abnormity.

16 Claims, 9 Drawing Sheets

(56) References Cited

FOREIGN PATENT DOCUMENTS

| | | |
|---|---|---|
| CN | 108233721 A | 6/2018 |
| CN | 207853453 U | 9/2018 |
| CN | 109484185 A | 3/2019 |
| JP | 2016082846 A | 5/2016 |
| JP | 2019221038 A | 12/2019 |
| KR | 20030081691 A | 10/2003 |

OTHER PUBLICATIONS

The First Chinese Office Action; corresponding to Application No. 201910546565; dated May 28, 2020.
CNIPA 2nd Office Action for corresponding CN Application No. 201910546256.5; dated Dec. 31, 2020.

\* cited by examiner

ELECTRIC VEHICLE DRIVE SYSTEM, BACKUP POWER SUPPLY DEVICE AND METHOD THEREFOR

CROSS-REFERENCE TO RELATED APPLICATIONS

The present invention claims priority under 35 U.S.C. § 119 to Chinese application No. 201910546256.5, filed Jun. 21, 2019, the entire content of which is incorporated herein by reference.

FIELD

The present disclosure relates to the field of power electronics technology, and in particular, to an electric vehicle drive system, a backup power supply device and a backup power supply method therefor.

BACKGROUND

Generally, an electric vehicle uses a low voltage battery to power its electric vehicle drive system through a low voltage power supply. When the low voltage battery is supplying power normally, the electric vehicle drive system can output a drive signal to an inverter, to drive a switch in the inverter to act, so as to convert a voltage on a high voltage direct current (DC) bus of the electric vehicle into an alternating current (AC) voltage that drives a motor to operate, so that the motor may operate normally. When the low voltage battery has power supply abnormity, the electric vehicle drive system cannot output the drive signal, and consequently, the motor cannot operate normally.

Therefore, in conventional redundant power supply method with dual power supplies, a solution employing dual low voltage batteries and respective low voltage power supply circuits or one employing dual low voltage power supply circuits sharing one low voltage battery is used to provide dual power supplies for the electric vehicle drive system.

In case of the solution employing dual low voltage batteries and respective low voltage power supply circuits, although when a low voltage power supply circuit has power supply abnormity, another low voltage power supply circuit can be switched to to supply the electric vehicle drive system to ensure normal operation thereof, employment of dual low voltage batteries increases the cost of the electric vehicle drive and installation space occupied by the electric vehicle drive system. In case of the dual low voltage power supply solution employing dual low voltage power supply circuits sharing one low voltage battery, although dual low voltage power supply circuits are provided, there is still the problem that the electric vehicle drive system is paralyzed and the motor cannot operate under the control of an operator when the low voltage battery shared by the dual low voltage power supply circuits has power supply abnormity.

SUMMARY

In view of the above, the present disclosure provides an electric vehicle drive system, a backup power supply device and a backup power supply method for an electric vehicle drive system, to solve the problems that the cost is high and large installation space is occupied in case of the solution with dual low voltage batteries and that the electric vehicle drive system cannot operate normally when the low voltage battery has power supply abnormity in case of the solution with dual low voltage power supply circuits.

To achieve the foregoing objective, the following technical solutions are provided according to embodiments of the present disclosure.

A backup power supply method for an electric vehicle drive system according to a first aspect of the present disclosure includes:
converting a voltage on a high voltage DC bus of an electric vehicle into a backup input voltage;
determining whether a low voltage battery in the electric vehicle drive system has power supply abnormity; and
determining the backup input voltage to be an input voltage of a low voltage power supply circuit in the electric vehicle drive system, in a case that the low voltage battery has power supply abnormity.

In an embodiment, after converting the voltage on the high voltage DC bus of the electric vehicle into the backup input voltage, the method further includes:
powering a drive circuit in the electric vehicle drive system with the backup input voltage.

In an embodiment, after converting the voltage on the high voltage DC bus of the electric vehicle into the backup input voltage, the method further includes:
determining whether the backup input voltage is normal; and
determining a voltage of the low voltage battery to be the input voltage, in a case that the backup input voltage is abnormal.

In an embodiment, after determining whether the backup input voltage is normal, the method further includes:
determining the voltage of the low voltage battery to be the input voltage, in a case that the backup input voltage is normal and the low voltage battery supplies power normally.

In an embodiment, after determining whether the backup input voltage is normal, the method further includes:
outputting abnormal status feedback information of the low voltage battery and/or the backup input voltage to a controller of the electric vehicle drive system, in a case that the backup input voltage is abnormal and/or the low voltage battery has power supply abnormity.

A backup power supply device for an electric vehicle drive system according to a second aspect of the present disclosure includes a high voltage isolation power supply and a high-low voltage power supply switching circuitry.

An input terminal of the high voltage isolation power supply is connected to a high voltage DC bus of an electric vehicle, and an output terminal of the high voltage isolation power supply is connected to an input terminal of the high-low voltage power supply switching circuitry. The high voltage isolation power supply is configured to: convert a voltage on the high voltage DC bus into a backup input voltage, and output the backup input voltage to the high-low voltage power supply switching circuitry.

Another input terminal of the high-low voltage power supply switching circuitry is connected to an output terminal of a low voltage battery in the electric vehicle drive system, and an output terminal of the high-low voltage power supply switching circuitry is connected to an input terminal of a low voltage power supply circuit in the electric vehicle drive system. The high-low voltage power supply switching circuitry is configured to determine the backup input voltage to be an input voltage of the low voltage power supply circuit in a case that the low voltage battery has power supply abnormity.

In an embodiment, the low voltage power supply circuit includes a low voltage power supply and a drive isolation power supply, and the output terminal of the high-low voltage power supply switching circuitry is connected to a power supply terminal of a drive circuit in the electric vehicle drive system through the low voltage power supply and the drive isolation power supply in sequence.

In an embodiment, the low voltage power supply circuit includes a low voltage power supply, and the output terminal of the high voltage isolation power supply is further connected to a power supply terminal of a drive circuit in the electric vehicle drive system.

In an embodiment, the high-low voltage power supply switching circuitry is further configured to determine a voltage of the low voltage battery to be the input voltage in a case that the high voltage isolation power supply has power supply abnormity.

In an embodiment, the high-low voltage power supply switching circuitry is further configured to determine the voltage of the low voltage battery to be the input voltage in a case that the high voltage isolation power supply and the low voltage battery both supply power normally.

In an embodiment, the high-low voltage power supply switching circuitry includes two diodes. Anodes of the two diodes function as two input terminals of the high-low voltage power supply switching circuitry and are respectively connected to the output terminal of the high voltage isolation power supply and a positive electrode of the low voltage battery, cathodes of the two diodes are connected to each other, and a connection point of the cathodes of the two diodes functions as the output terminal of the high-low voltage power supply switching circuitry.

In an embodiment, the high-low voltage power supply switching circuitry is further connected to a receiving terminal of a controller of the electric vehicle drive system through a transmitting terminal of the high-low voltage power supply switching circuitry.

In an embodiment, the high-low voltage power supply switching circuitry is further configured to output abnormal status feedback information of the low voltage battery and/or the high voltage isolation power supply to the controller.

An electric vehicle drive system according to a third aspect of the present disclosure includes: a controller, a drive circuit, a low voltage battery, a low voltage power supply circuit, and the backup power supply device for an electric vehicle drive system described above.

An output terminal of the controller is connected to an input terminal of the drive circuit, and the controller is configured to output a drive signal to the input terminal of the drive circuit on receiving a drive command from an operator.

An output terminal of the drive circuit functions as an output terminal of the electric vehicle drive system, and is connected to a control terminal of an inverter of the electric vehicle, and the drive circuit is configured to: amplify the drive signal, and output the amplified drive signal to the inverter to control the inverter to operate.

In an embodiment, the controller is further configured to control, through the drive circuit, the inverter to be in an active short circuit state in a case that the electric vehicle is in a towed state or a taxiing state.

In an embodiment, the controller is further configured to send received abnormal status feedback information to a vehicle controller through a controller area network (CAN).

In an embodiment, the low voltage power supply circuit includes a low voltage power supply, or the low voltage power supply circuit includes a low voltage power supply and a drive isolation power supply, an input terminal of the low voltage power supply functions as an input terminal of the low voltage power supply circuit, and an output terminal of the low voltage power supply is connected to a power supply terminal of the controller.

In an embodiment, the electric vehicle drive system further includes: a communications circuit, a resolver excitation processing circuit, and a signal processing circuit, where the output terminal of the low voltage power supply is connected to a power supply terminal of the communications circuit, a power supply terminal of the resolver excitation processing circuit, and a power supply terminal of the signal processing circuit.

According to the present disclosure, the voltage on the high voltage DC bus of the electric vehicle is converted into the backup input voltage, and the backup input voltage is determined to be the input voltage of the low voltage power supply circuit in the electric vehicle drive system when the low voltage battery has power supply abnormity, to supply power to the electric vehicle drive system, thereby ensuring that the electric vehicle drive system can operate normally. Thus, the problem that the electric vehicle drive system cannot operate normally when the low voltage battery has power supply abnormity in case of the solution with dual low voltage power supply circuits in conventional technology is solved by the present disclosure. In addition, the normal operation of the electric vehicle drive system when the low voltage battery has power supply abnormity is ensured by using merely the voltage on the high voltage DC bus with no additional low voltage batteries required. In this way, the problem that the cost is high and large installation space is occupied in an electric vehicle drive system in case of dual low voltage batteries is solved.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrate some embodiments of the present disclosure, other drawings may be obtained by those ordinarily skilled in the art based on these drawings without any creative efforts.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

It should be noted that, the terms in the present disclosure such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device.

Figure 1:
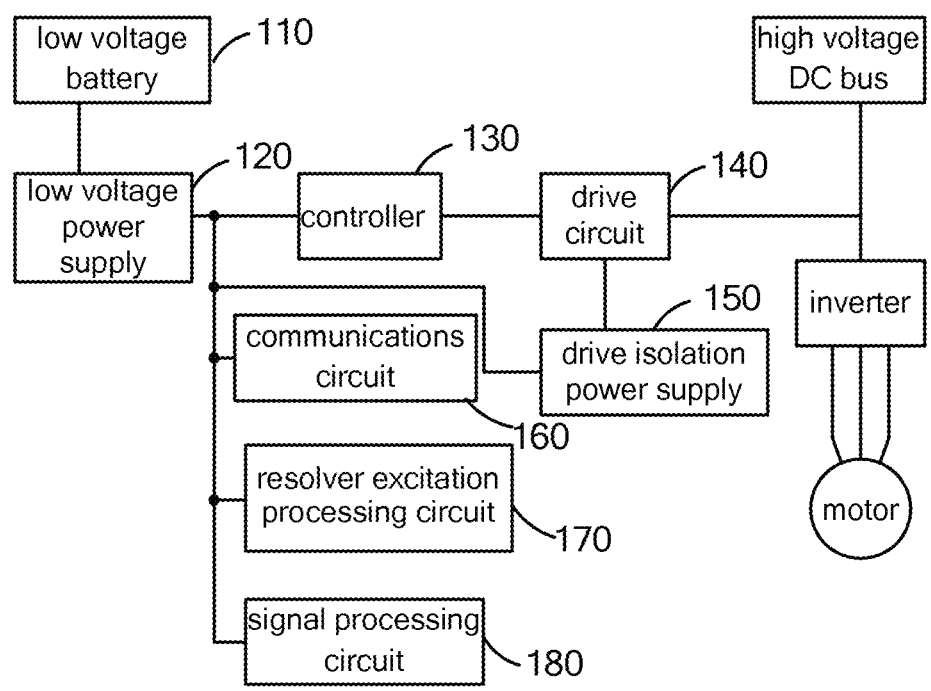
FIG. 1 is a schematic diagram of an electric vehicle drive system in conventional technology.

A particular structure of a basic electric vehicle drive system is shown in FIG. 1, which includes: a low voltage battery 110, a low voltage power supply 120, a controller 130, a drive circuit 140, a drive isolation power supply 150, a communications circuit 160, a resolver excitation processing circuit 170, and a signal processing circuit 180.

An input terminal of the low voltage power supply 120 is connected to an output terminal of the low voltage battery 110, and an output terminal of the low voltage power supply 120 is connected to a power supply terminal of the controller 130, a power supply terminal of the communications circuit 160, a power supply terminal of the resolver excitation processing circuit 170, a power supply terminal of the signal processing circuit 180, and an input terminal of the drive isolation power supply 150. The low voltage power supply 120 converts a received voltage of the low voltage battery 110 into an operating voltage of the controller 130, the communications circuit 160, the resolver excitation processing circuit 170 and the signal processing circuit 180, and into a voltage required by the drive isolation power supply 150, thereby supplying power to the controller 130, the communications circuit 160, the resolver excitation processing circuit 170 and the signal processing circuit 180, to enable them to operate normally, and outputs the voltage required by the drive isolation power supply 150 to the input terminal of the drive isolation power supply 150.

An output terminal of the drive isolation power supply 150 is connected to a power supply terminal of the drive circuit 140. The drive isolation power supply 150 converts the voltage required by itself into a drive voltage of the drive circuit 140, to supply power to the drive circuit 140, so that the drive circuit 140 can operate normally.

An output terminal of the controller 130 is connected to a control terminal of the drive circuit 140. On receiving a drive command from an operator, the controller 130 outputs a drive signal to an input terminal of the drive circuit 140.

An output terminal of the drive circuit 140 functions as an output terminal of the electric vehicle drive system, and is connected to a control terminal of an inverter in the electric vehicle. The drive circuit 140 amplifies a received drive signal with the drive voltage, and outputs the amplified drive signal to the control terminal of the inverter to control the inverter to operate. The inverter converts a direct current on a DC bus into an alternating current required by a motor in the electric vehicle, so that the motor can operate normally.

However, when the low voltage battery 110 has power supply abnormity, for example, the low voltage battery 110 encounters power supply failure and thus cannot supply power normally, various components or circuits in the electric vehicle drive system cannot operate normally due to loss of power supply. As a consequence, the electric vehicle drive system is paralyzed, and the motor cannot operate under the control of the operator.

In conventional technology, the problems of a high cost and a large installation space may arise in case of the solution with dual low voltage batteries, and in case of the solution with dual power supply circuits, the electric vehicle drive system cannot operate normally when the low voltage battery encounters power supply abnormity.

Figure 2:
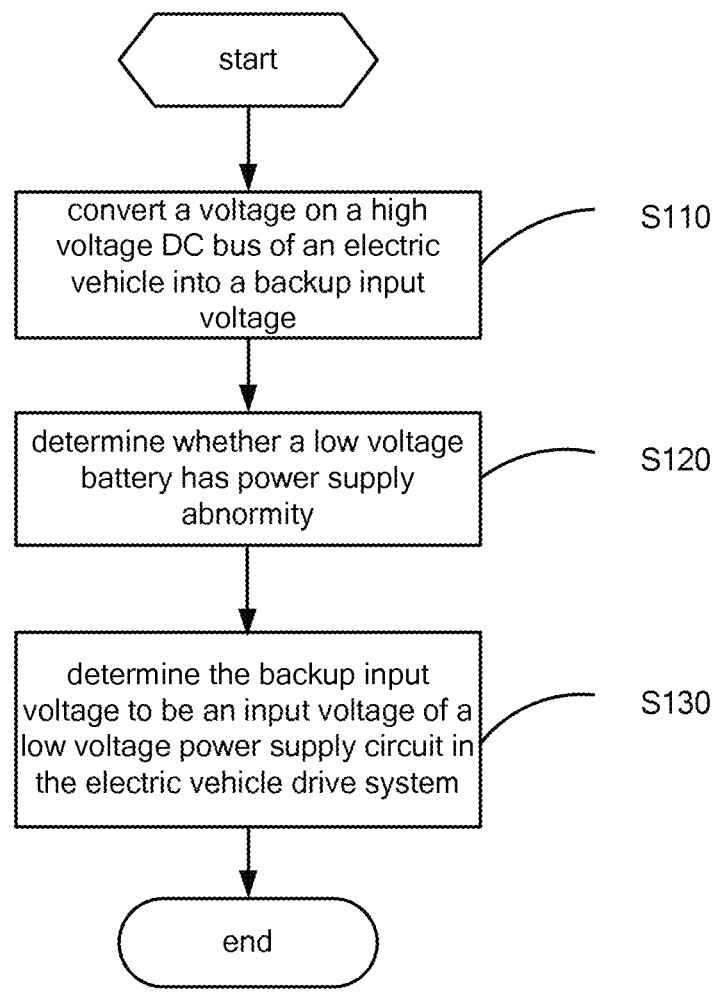
FIG. 2 is a schematic diagram of a backup power supply method for an electric vehicle drive system according to an embodiment of the present disclosure.

In view of this, a power supply method for an electric vehicle drive system is provided according to an embodiment of the present disclosure, which, as shown in FIG. 2, includes the following steps S110 to S180.

In step S110, a voltage on a high voltage DC bus of an electric vehicle is converted into a backup input voltage.

When a low voltage battery of the electric vehicle has power supply abnormity, for example, when the electric vehicle is in a towed state or a taxiing state or a low voltage power supply thereof is off, the high voltage DC bus can still supply power. Therefore, the high voltage DC bus functions as a backup power supply in the present disclosure, where the voltage on the high voltage DC bus of the electric vehicle is converted into the backup input voltage, to supply backup power to the electric vehicle drive system.

In step S120, it is determined whether a low voltage battery in the electric vehicle drive system has power supply abnormity.

In a case that the low voltage battery in the electric vehicle drive system has power supply abnormity, step S130 is executed.

In step S130, the backup input voltage is determined to be an input voltage of a low voltage power supply circuit in the electric vehicle drive system.

In the embodiment, the voltage on the high voltage DC bus of the electric vehicle is converted into the backup input voltage, and the backup input voltage is determined to be the input voltage of the low voltage power supply circuit in the electric vehicle drive system when the low voltage battery has power supply abnormity, to supply power to the electric vehicle drive system, thereby ensuring that the electric vehicle drive system can operate normally. Thus, the problem that the electric vehicle drive system cannot operate normally when the low voltage battery has power supply abnormity in case of the solution with dual low voltage power supply circuits in conventional technology is solved by the present disclosure. In addition, the normal operation of the electric vehicle drive system when the low voltage battery has power supply abnormity is ensured by using merely the voltage on the high voltage DC bus with no additional low voltage batteries required. In this way, the problem that the cost is high and large installation space is occupied in an electric vehicle drive system in case of dual low voltage batteries is solved.

In practice, the low voltage power supply circuit in the electric vehicle drive system may include the low voltage power supply 120 and the drive isolation power supply 150 as shown in FIG. 1. In this case, the low voltage power supply circuit receives the backup input voltage, and supplies power to the drive circuit through the low voltage power supply 120 and the drive isolation power supply 150 in sequence.

Or, the low voltage power supply circuit in the electric vehicle drive system may include only the low voltage power supply 120 as shown in FIG. 1, and the drive circuit may be powered directly by the backup input voltage. That is, after step S130, the power supply method for an electric vehicle drive system may further include powering the drive circuit in the electric vehicle drive system with the backup input voltage.

How to power the drive circuit in the electric vehicle drive system may be selected according to a specific application environments, which is not limited herein and shall all fall within the protection scope of the present disclosure.

Figure 3:
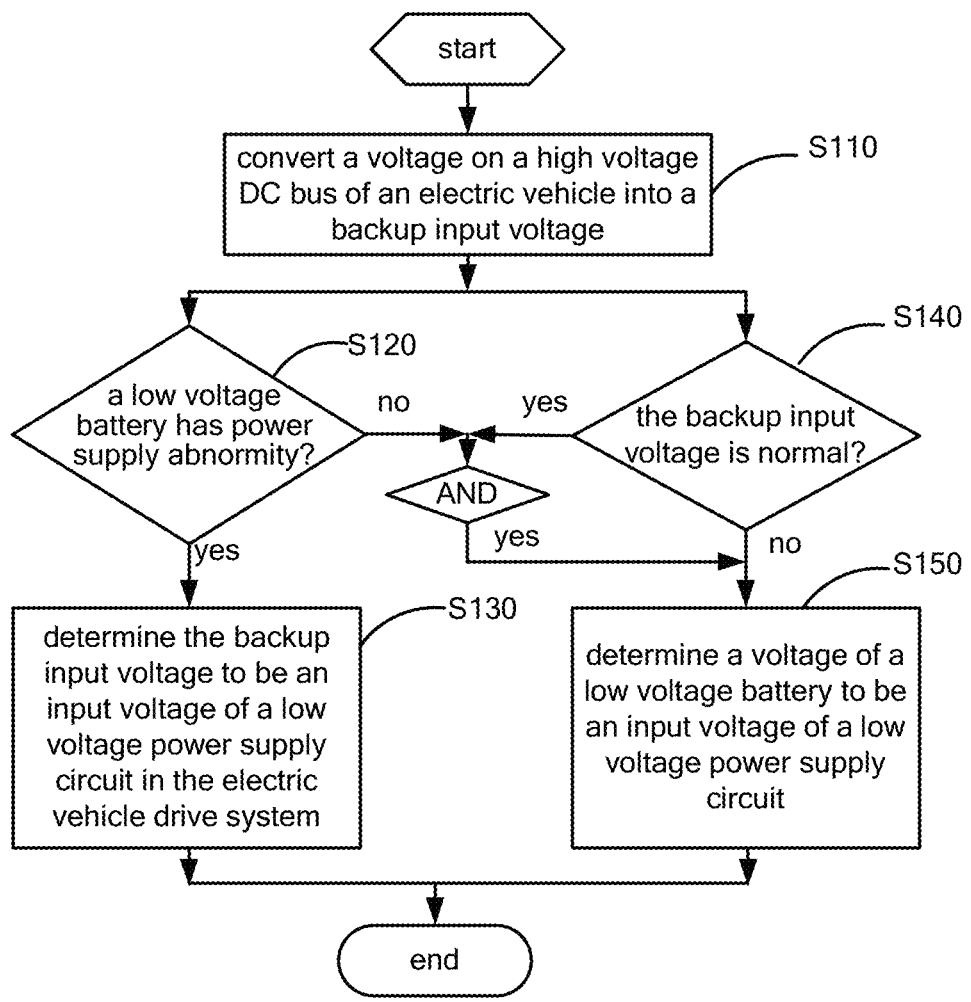
FIG. 3 is a schematic diagram of a backup power supply method for an electric vehicle drive system according to an embodiment of the present disclosure.

In practice, referring to FIG. 3, after step S110, the power supply method for an electric vehicle drive system further includes the following steps S140 and S150.

In step S140, it is determined whether the backup input voltage is normal.

In a case that the backup input voltage is abnormal, step S150 is executed. In a case that the backup input voltage is normal and the low voltage battery is normal, step S150 is executed.

In step S150, a voltage of the low voltage battery is determined to be the input voltage of the low voltage power supply circuit.

It is noted that by determination steps S120 and S140, it is ensured that the electric vehicle drive system is powered normally, thereby perfecting the backup power supply method for an electric vehicle drive system.

Figure 4:
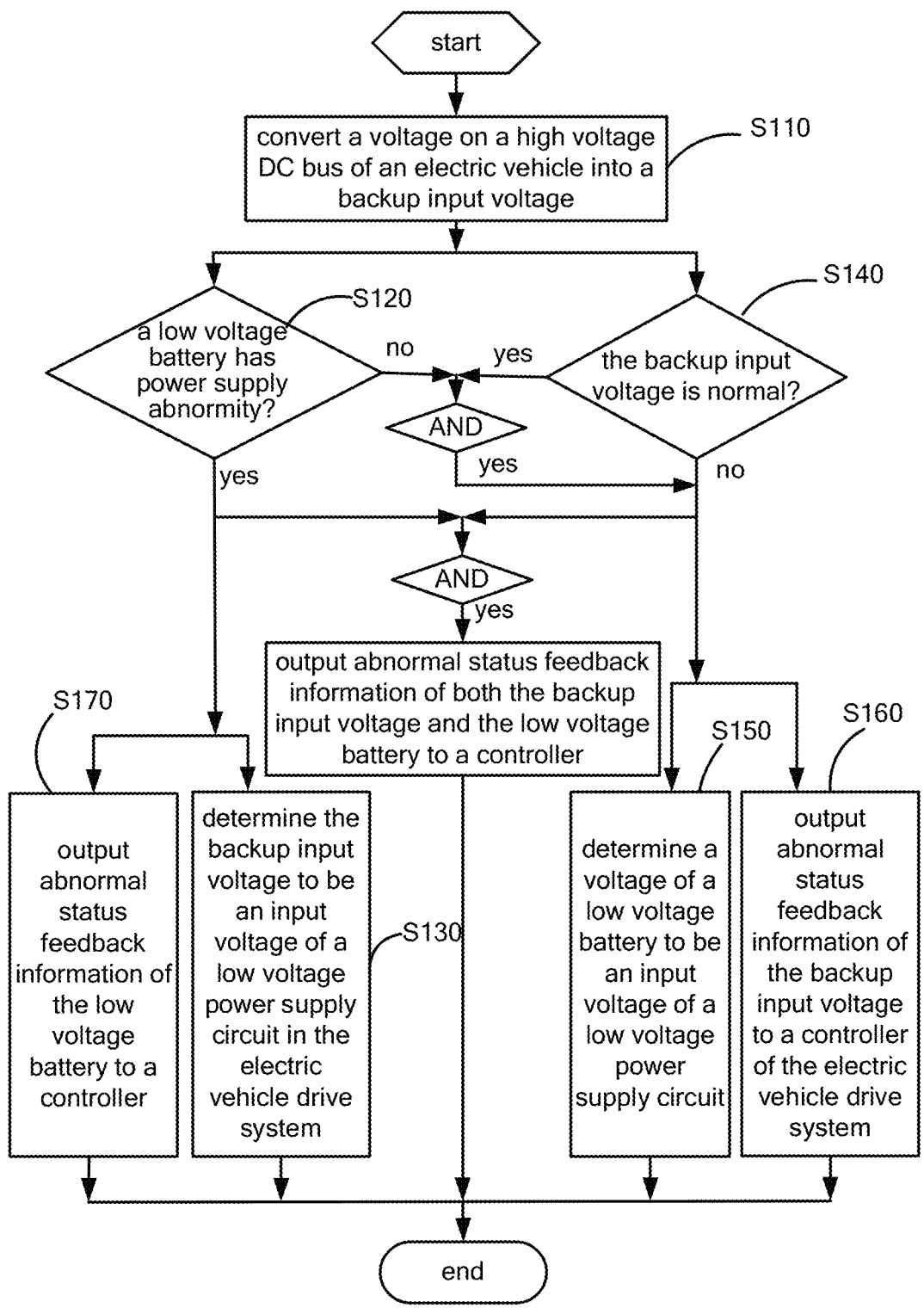
FIG. 4 is a schematic diagram of a backup power supply method for an electric vehicle drive system according to an embodiment of the present disclosure.

In practice, referring to FIG. 4, after steps S120 and S150, the power supply method for an electric vehicle drive system further includes:

executing step S160 in a case that the backup input voltage is abnormal;

executing step S170 in a case that the low voltage battery has power supply abnormity; and executing step S180 in a case that the backup input voltage is abnormal and the low voltage battery has power supply abnormity.

In step S160, abnormal status feedback information of the backup input voltage is outputted to a controller of the electric vehicle drive system.

In step S170, abnormal status feedback information of the low voltage battery is outputted to the controller of the electric vehicle drive system.

In step S180, the abnormal status feedback information of both the backup input voltage and the low voltage battery is outputted to the controller.

It is noted that by outputting corresponding abnormal status feedback information to the controller of the electric vehicle drive system, power supply failures of the backup input voltage and the low voltage battery can be collected by the controller of the electric vehicle drive system, and can further be sent to a vehicle controller through a CAN, so that an operator can obtain accurate power supply failures of the backup input voltage and the low voltage battery.

Figure 5:
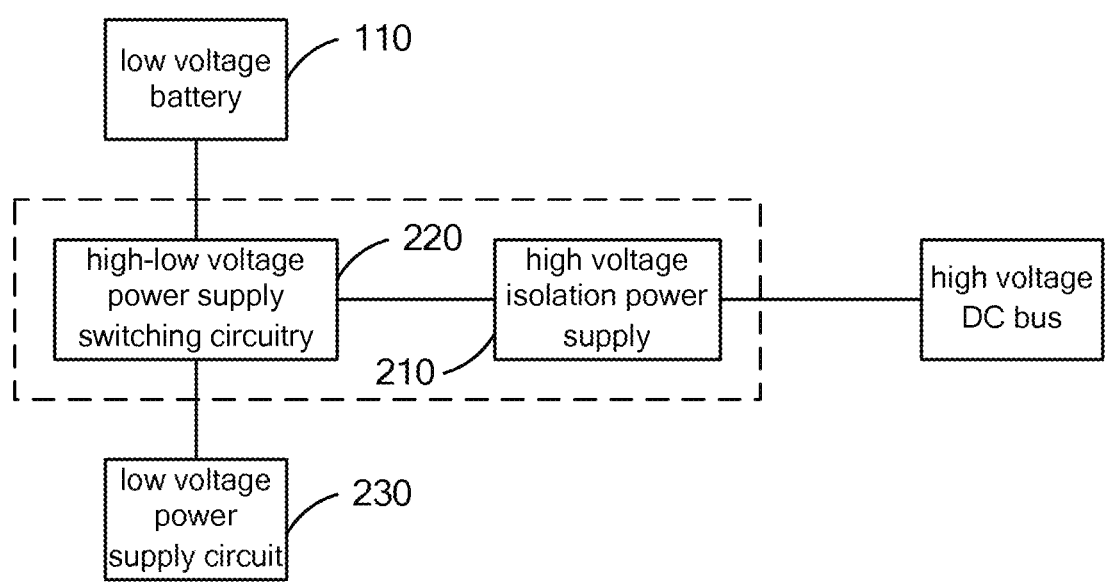
FIG. 5 is a schematic diagram of a backup power supply device for an electric vehicle drive system according to an embodiment of the present disclosure.

A backup power supply device for an electric vehicle drive system is provided according to an embodiment of the present disclosure. Referring to FIG. 5, the backup power supply device for an electric vehicle drive system includes: a high voltage isolation power supply 210 and a high-low voltage power supply switching circuitry 220.

An input terminal of the high voltage isolation power supply 210 is connected to a high voltage DC bus of an electric vehicle, that is, to a DC side of an inverter. An output terminal of the high voltage isolation power supply 210 is connected to an input terminal of the high-low voltage power supply switching circuitry 220. The high voltage isolation power supply 210 converts a voltage received from the high voltage DC bus into a backup input voltage, and outputs the backup input voltage to an input terminal of the high-low voltage power supply switching circuitry 220.

It is noted that the high voltage isolation power supply 210 may be a flyback power supply, a push-pull power supply, or other components or topological forms that realize the same function and that a voltage range thereof may be adjusted by the high voltage isolation power supply 210 according to its output form, which is not specifically limited herein and shall all fall within the protection scope of the present disclosure.

Another input terminal of the high-low voltage power supply switching circuitry 220 is connected to an output terminal of a low voltage battery 110 in the electric vehicle drive system, and an output terminal of the high-low voltage power supply switching circuitry 220 is connected to an input terminal of a low voltage power supply circuit 230 in the electric vehicle drive system. The high-low voltage power supply switching circuitry 220 receives power from both the low voltage battery 110 and the high voltage isolation power supply 210. In a case that the low voltage battery 110 has power supply abnormity, the high-low voltage power supply switching circuitry 220 determines the backup input voltage from the high voltage isolation power supply 210 to be an input voltage of the low voltage power supply circuit 230, to supply power to the electric vehicle drive system. In a case that the high voltage isolation power supply 210 has power supply abnormity or in a case that both the low voltage battery 110 and the high voltage isolation power supply 210 supply power normally, a voltage of the low voltage battery 110 is determined to be the input voltage of the low voltage power supply circuit 230, to supply power to the electric vehicle drive system.

In practice, there may be two diodes connected in parallel in the high-low voltage power supply switching circuitry 220, where the two diodes are powered by the low voltage battery 110 and the high voltage isolation power supply 210 respectively, to ensure that when one of the low voltage battery 110 and the high voltage isolation power supply 210 is powered off, the other one can be switched to for power supply and that the electric vehicle drive system is powered uninterruptedly. When the low voltage battery 110 and the high voltage isolation power supply 210 both operate normally, the high-low voltage power supply switching circuitry 220 may receive the higher one of voltages of the low voltage battery 110 and the high voltage isolation power supply 210 through the two diodes, and determine the higher voltage to be an input voltage of the high-low voltage power supply switching circuitry 220. In practice, the high-low voltage power supply switching circuitry 220 may be implemented in other ways, for example, by monitoring the voltages of the low voltage battery 110 and the high voltage isolation power supply 210 with cooperation with two controllable switches to achieve switching between power supplies, notwithstanding there may be a time gap in switching of the power supplies due to software implementation of this way, which may be avoided by providing a grounding capacitor. The specific implementation of the high-low voltage power supply switching circuitry 220 may be determined based on an application environment thereof, which shall all fall within the protection scope of the present disclosure.

Besides, a transmitting terminal of the high-low voltage power supply switching circuitry 220 is connected to a receiving terminal of a controller 130 in the electric vehicle drive system. In a case that the low voltage battery 110 has power supply abnormity, while determining the backup input voltage to be the input voltage of the low voltage power supply circuit 230, the high-low voltage power supply switching circuitry 220 also outputs abnormal status feedback information of the low voltage battery 110 to the receiving terminal of the controller 130. In a case that the high voltage isolation power supply 210 has power supply abnormity, while determining the voltage of the low voltage battery 110 to be the input voltage of the low voltage power supply circuit 230, the high-low voltage power supply switching circuitry 220 also outputs abnormal status feedback information of the high voltage isolation power supply 210 to the receiving terminal of the controller 130.

According to the present disclosure, the voltage on the high voltage DC bus of the electric vehicle is converted into the backup input voltage by the high voltage isolation power supply 210, the backup input voltage is determined to be the input voltage of the low voltage power supply circuit 230 in the electric vehicle drive system by the high-low voltage power supply switching circuitry 220 when the low voltage battery 110 has power supply abnormity, to supply power to the electric vehicle drive system. In this way, it is ensured that the electric vehicle drive system can still operate normally, so that the electric vehicle drive system can drive the vehicle to run normally to avoid the risk of loss of drive torque. Thus the problem that the electric vehicle drive system cannot operate normally in a case that the low voltage battery 110 has power supply abnormity is solved by the present disclosure. In addition, the normal operation of the electric vehicle drive system when the low voltage battery 110 has power supply abnormity is ensured merely by the high voltage isolation power supply 210 obtaining power from the high voltage DC bus with no additional low voltage batteries required. In this way, the problem that the cost is high and large installation space is occupied in an electric vehicle drive system is solved by the present disclosure.

There are two ways of supplying power to the drive circuit 140 in the present disclosure.

In a first way, the low voltage power supply circuit 230 includes a low voltage power supply 120 and a drive isolation power supply 150, as shown in FIG. 3. An input terminal of the low voltage power supply 120 is connected to an output terminal of the high-low voltage power supply switching circuitry 220, and an output terminal of the low voltage power supply 120 is connected to both an input terminal of the drive isolation power supply 150 and a power supply terminal of the controller 130 in the electric vehicle drive system. The low voltage power supply 120 supplies power to the controller 130 by converting the input voltage of the low voltage power supply circuit 230 into an operating voltage of the controller 130, to ensure that the controller 130 operates normally. In addition, the low voltage power supply 120 also converts the input voltage of the low voltage power supply circuit 230 into a voltage required by the drive isolation power supply 150, and outputs the voltage to the input terminal of the drive isolation power supply 150.

In a second way, the low voltage power supply circuit 230 only includes a low voltage power supply 120, as shown in FIG. 5. On the basis of FIG. 2, the output terminal of the high voltage isolation power supply 210 is also connected to a power supply terminal of the drive circuit 140 in the electric vehicle drive system. The high voltage isolation power supply 210 also converts the voltage on the high voltage DC bus of the electric vehicle into a drive voltage of the drive circuit 140, and outputs the drive voltage to the power supply terminal of the drive circuit, to supply power to the drive circuit 140 and to ensure that the drive circuit 140 operates normally.

In practice, how to supply power to the drive circuit 140 may be selected according to specific application environments, which is not limited herein and shall all fall within the protection scope of the present disclosure.

In addition, when the electric vehicle is in a taxiing state or a towed state, for example, when the low voltage power supply is off during high-speed running of the electric vehicle, that is, in a high speed taxiing state, or the electric vehicle is being towed at a high speed, that is, in a high speed towed state, the backup power supply device can provide emergency power or backup power to the controller 130 and the drive circuit 140, so that the controller 130 can still control through the drive circuit 140 the inverter to be in an active short circuit state, thereby suppressing feed of an electromotive force of a motor on a bus voltage and protecting switches in the inverter from being damaged by a counter electromotive force generated by the motor.

An electric vehicle drive system is provided according to an embodiment of the present disclosure. Referring to FIG. 6, FIG. 7, FIG. 8 or FIG. 9, the electric vehicle drive system includes: a controller 130, a drive circuit 140, a low voltage battery 110, a low voltage power supply circuit 230, and the backup power supply device for an electric vehicle drive system according to any one of the above embodiments.

An output terminal of the controller 130 is connected to an input terminal of the drive circuit 140. On receiving a drive command from an operator, the controller 130 outputs a drive signal to the input terminal of the drive circuit 140 through the output terminal of the controller 130 itself.

An output terminal of the drive circuit 140 functions as an input terminal of the electric vehicle drive system, and is connected to a control terminal of an inverter in an electric vehicle. The drive circuit 140 amplifies a received drive signal with a drive voltage, outputs the amplified drive signal to the control terminal of the inverter through the output terminal of the drive circuit 140 itself, to control a switch in the inverter to be on and the inverter to operate to convert a DC voltage from a high voltage battery in the electric vehicle into a three-phase AC voltage that can drive a motor in the electric vehicle.

Besides, when the electric vehicle is in a towed state or a taxiing state, the controller 130 controls, through the drive circuit 140, the inverter to be in an active short circuit state, thereby protecting switches in the inverter from being damaged by a counter electromotive force generated by the motor.

Furthermore, when abnormal status feedback information of the low voltage battery 110 or a high voltage isolation power supply 210 is received at a receiving terminal of the controller 130, the controller 130 sends the feedback information to a vehicle controller through a CAN.

The structure and principle of the backup power supply device are similar as those in the above embodiments, which will not be described again herein.

Figure 6:
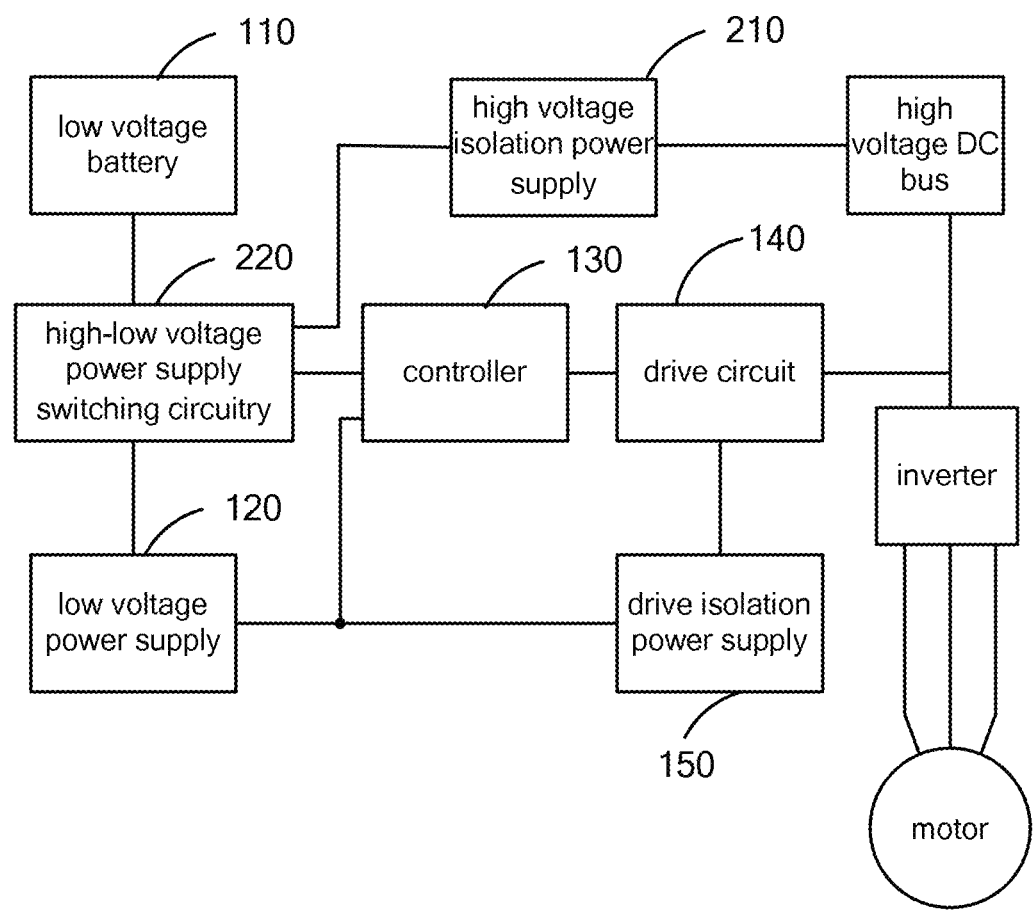
FIG. 6 is a schematic diagram of implementation of a backup power supply device for an electric vehicle drive system according to an embodiment of the present disclosure.

Referring to FIG. 6, the low voltage power supply circuit 230 may include a low voltage power supply 120 and a drive isolation power supply 150.

An input terminal of the low voltage power supply 120 is connected to an output terminal of a high-low voltage power supply switching circuitry 220, and an output terminal of the low voltage power supply 120 is connected to both an input terminal of the drive isolation power supply 150 and a power supply terminal of the controller 130 in the electric vehicle drive system. The low voltage power supply 120 supplies power to the controller 130 by converting the input voltage of the low voltage power supply circuit 230 into an operating voltage of the controller 130, to ensure that the controller 130 operates normally. In addition, the low voltage power supply 120 also converts the input voltage of the low voltage power supply circuit 230 into a voltage required by the drive isolation power supply 150, and outputs the voltage to the input terminal of the drive isolation power supply 150.

It is noted that, the low voltage power supply 120 may be a system basis chip (System Basis Chip, SBC), a boost chopper, a single ended primary inductor convertor (Single Ended Primary Inductor Convertor, SEPIC), or a half-bridge circuit, or may be other components or topologies that can realize the same function, which are not limited herein and shall all fall within the protection scope of the present disclosure.

In addition, an output terminal of the drive isolation power supply 150 is connected to a power supply terminal of the drive circuit 140 in the electric vehicle drive system. The drive isolation power supply 150 converts the voltage required by the drive isolation power supply 150 itself into the drive voltage of the drive circuit 140 and outputs the drive voltage to the power supply terminal of the drive circuit 140, to power the drive circuit 140 and ensure normal operation of the drive circuit 140.

Figure 7:
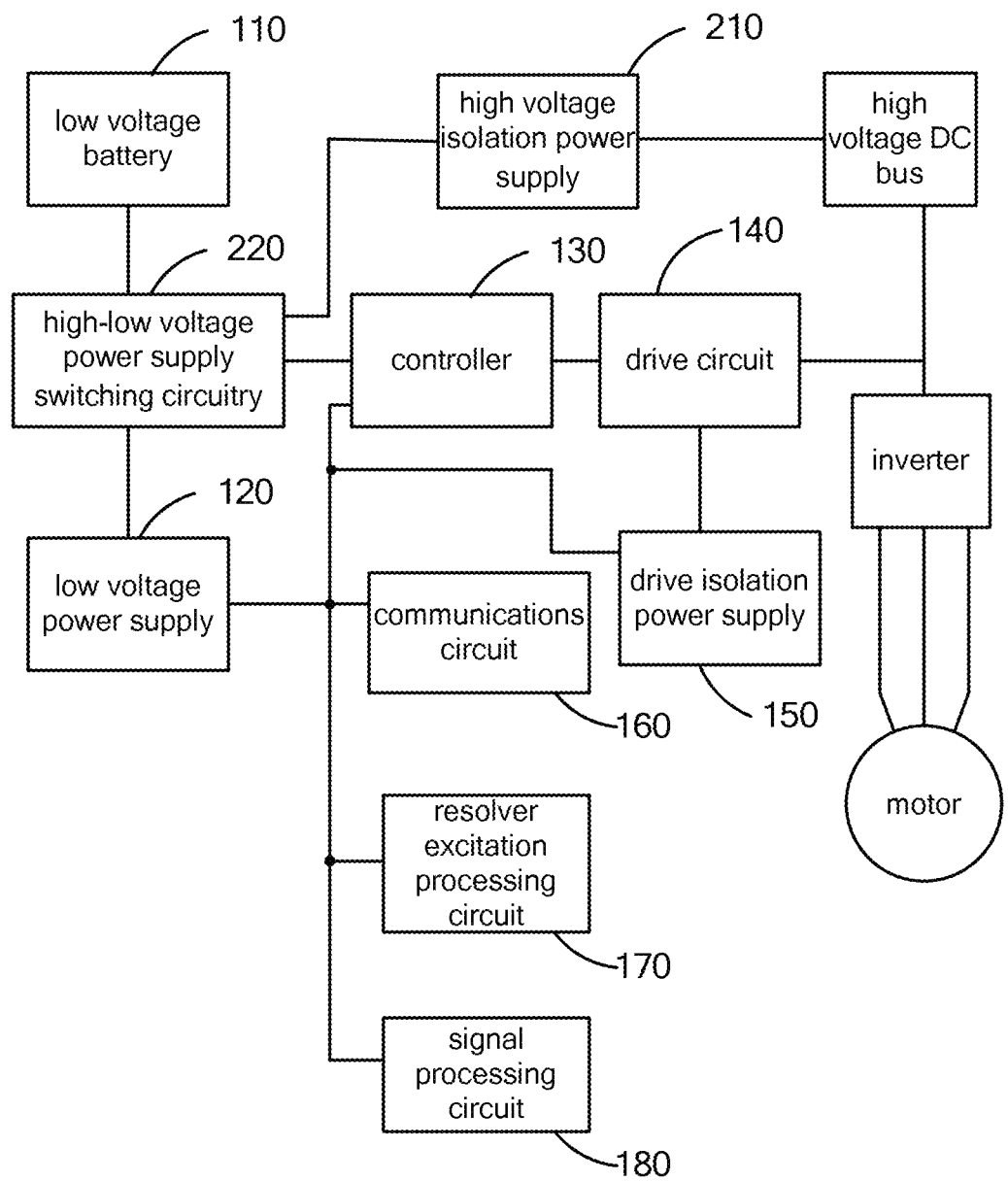
FIG. 7 is a schematic diagram of implementation of a backup power supply device for an electric vehicle drive system according to an embodiment of the present disclosure.

In an embodiment, the output terminal of the low voltage power supply 120 is connected to a power supply terminal of a communications circuit 160, a power supply terminal of a resolver excitation processing circuit 170, and a power supply terminal of a signal processing circuit 180 that are included in the electric vehicle drive system, as shown in FIG. 7.

Figure 8:
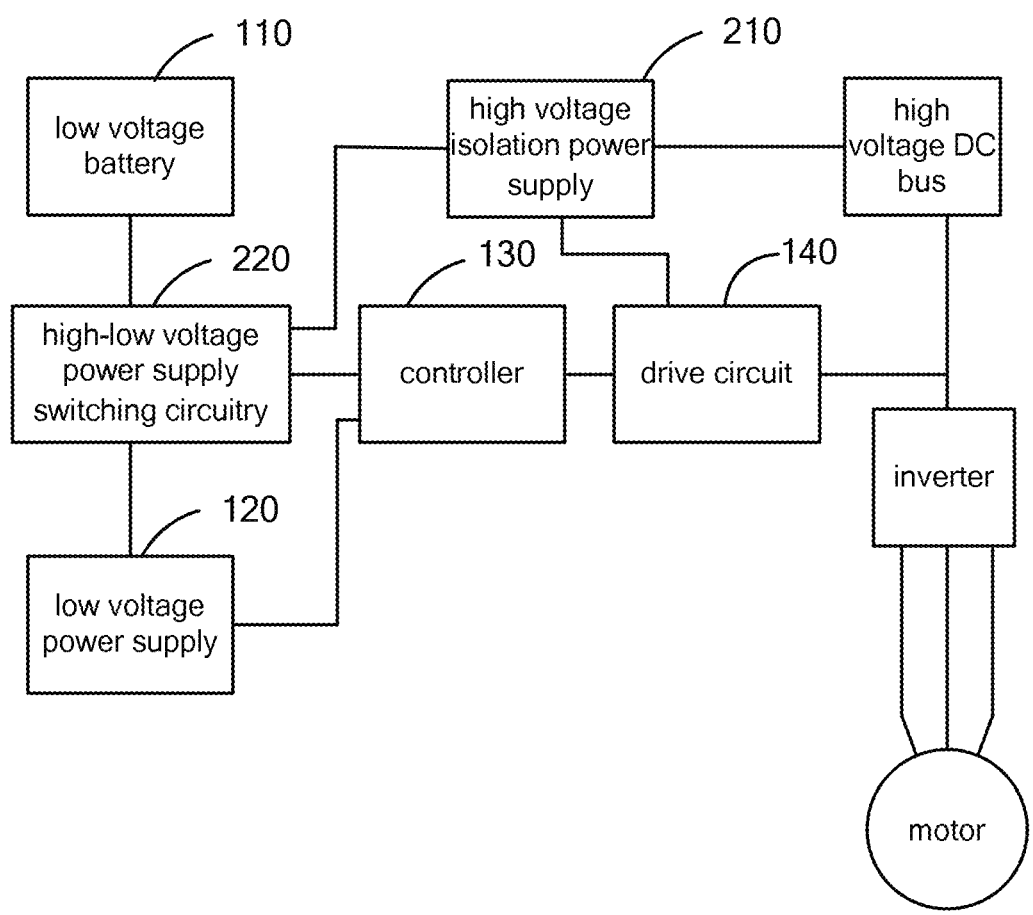
FIG. 8 is a schematic diagram of implementation of a backup power supply device for an electric vehicle drive system according to an embodiment of the present disclosure.

The low voltage power supply circuit 230 may include only a low voltage power supply 120, as shown in FIG. 8.

On the basis of the embodiment as shown in FIG. 2, the output terminal of the high voltage isolation power supply 210 is also connected to a power supply terminal of the drive circuit 140 in the electric vehicle drive system. The high voltage isolation power supply 210 also converts the voltage on the high voltage DC bus of the electric vehicle into a drive voltage of the drive circuit 140, and outputs the drive voltage to the power terminal of the drive circuit 140, to supply power to the drive circuit 140 and to ensure that the drive circuit 140 can operate normally.

Besides, the input terminal of the low voltage power supply 120 is connected to the output terminal of the high-low voltage power supply switching circuitry 220, and the output terminal of the low voltage power supply 120 is connected to the power supply terminal of the controller 130 in the electric vehicle drive system. The low voltage power supply 120 converts the input voltage of the low voltage power supply circuit 230 into an operating voltage of the controller 130, and outputs the voltage to a power supply terminal of the controller 130, to supply power to the controller 130 and ensure that the controller 130 can operate normally.

Figure 9:
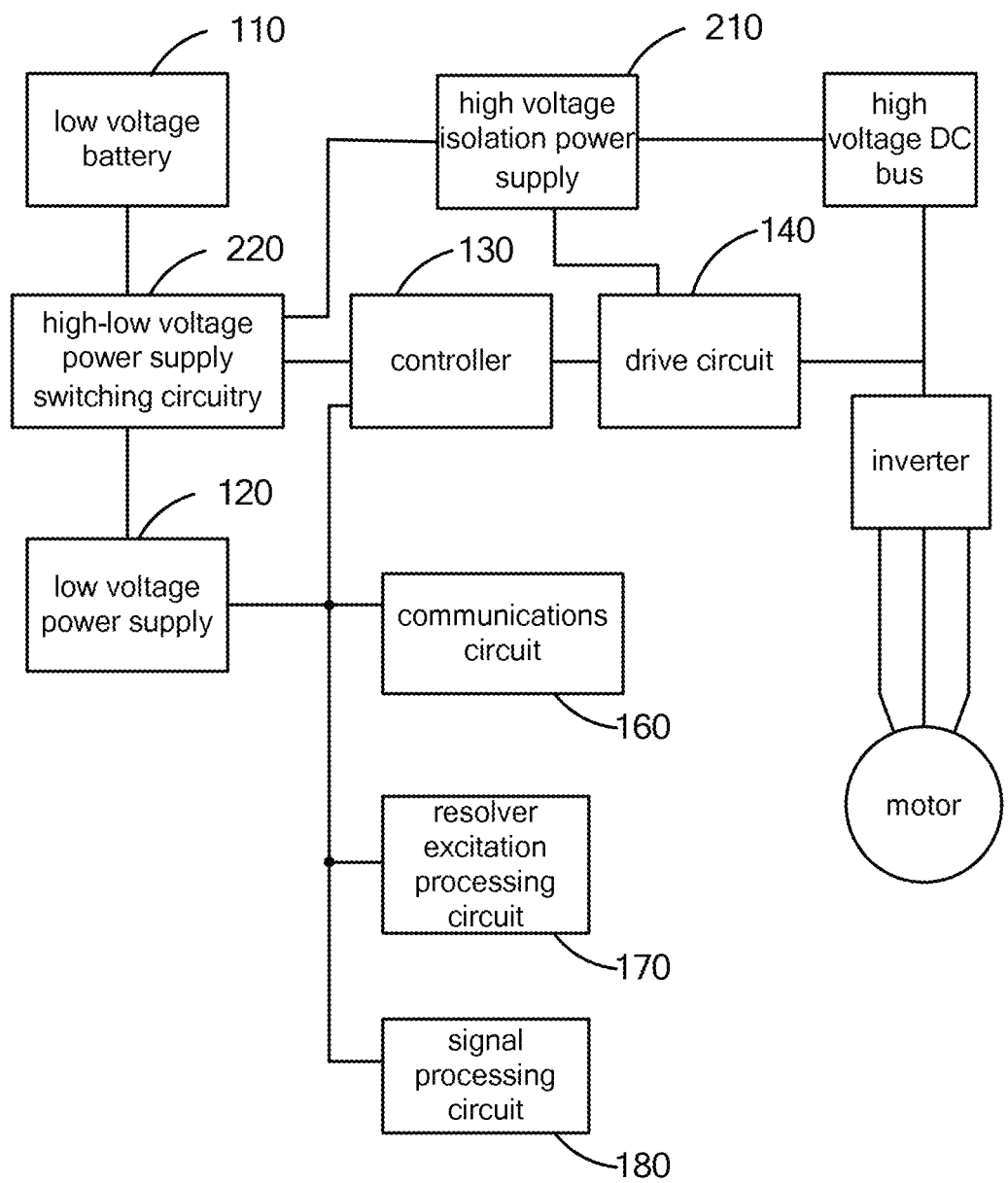
FIG. 9 is a schematic diagram of implementation of a backup power supply device for an electric vehicle drive system according to an embodiment of the present disclosure.

In an embodiment, the output terminal of the low voltage power supply 120 is connected to the power supply terminal of the communications circuit 160, the power supply terminal of the resolver excitation processing circuit 170, and the power supply terminal of the signal processing circuit 180 that are included in the electric vehicle drive system, as shown in FIG. 9.

The structure and principle of the backup power supply device are similar as those in the above embodiments, which will not be described again herein.

The embodiments in this specification are described in a progressive manner. For the same or similar parts between the embodiments, one may refer to the description of other embodiments. Each embodiment lays emphasis on differences from other embodiments. Since the system embodiment is similar to the method embodiment, the description for the system embodiment is relatively simple. For related parts, reference may be made to description in the method embodiment. The system embodiment described above are merely illustrative, and units described as separate components may or may not be physically separated. The components shown as units may be or not be physical units, i.e., the units may be located at the same place or may be distributed onto multiple network units. All or some of the modules may be selected based on actual needs to realize the objective of the solutions according to the embodiments. The solutions according to the embodiments can be understood and implemented by those skilled in the art without creative work.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application, such implementation should not be considered to be beyond the scope of the present disclosure.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A backup power supply method for an electric vehicle drive system, the method comprising:
converting a voltage on a high voltage direct current (DC) bus of an electric vehicle into a backup input voltage;
powering a drive circuit in the electric vehicle drive system with the backup input voltage, wherein the drive circuit is configured to amplify a drive signal from a controller of the electric vehicle drive system and output the amplified drive signal to an inverter of the electric vehicle to control the inverter to operate;
determining whether a low voltage battery in the electric vehicle drive system has power supply abnormity; and
determining the backup input voltage to be an input voltage of a low voltage power supply circuit in the electric vehicle drive system, in a case that the low voltage battery has power supply abnormity.

2. The method according to claim 1, wherein after converting the voltage on the high voltage DC bus of the electric vehicle into the backup input voltage, the method further comprises:
   determining whether the backup input voltage is normal; and
   determining a voltage of the low voltage battery to be the input voltage, in a case that the backup input voltage is abnormal.

3. The method according to claim 2, wherein after determining whether the backup input voltage is normal, the method further comprises:
   determining the voltage of the low voltage battery to be the input voltage, in a case that the backup input voltage is normal and low voltage battery supplies power normally.

4. The method according to claim 2, wherein after determining whether the backup input voltage is normal, the method further comprises:
   outputting abnormal status feedback information of the low voltage battery and/or the backup input voltage to the controller of the electric vehicle drive system, in a case that the backup input voltage is abnormal and/or the low voltage battery has power supply abnormity.

5. The method according to claim 1, wherein after converting the voltage on the high voltage DC bus of the electric vehicle into the backup input voltage, the method further comprises:
   determining whether the backup input voltage is normal; and
   determining a voltage of the low voltage battery to be the input voltage, in a case that the backup input voltage is abnormal.

6. A backup power supply device for an electric vehicle drive system, the device comprising a high voltage isolation power supply and a high-low voltage power supply switching circuitry, wherein:
   an input terminal of the high voltage isolation power supply is connected to a high voltage DC bus of an electric vehicle, an output terminal of the high voltage isolation power supply is connected to an input terminal of the high-low voltage power supply switching circuitry, and the high voltage isolation power supply is configured to: convert a voltage on the high voltage DC bus into a backup input voltage, and output the backup input voltage to the high-low voltage power supply switching circuitry; and
   another input terminal of the high-low voltage power supply switching circuitry is connected to an output terminal of a low voltage battery in the electric vehicle drive system, an output terminal of the high-low voltage power supply switching circuitry is connected to an input terminal of a low voltage power supply circuit in the electric vehicle drive system, and the high-low voltage power supply switching circuitry is configured to determine the backup input voltage to be an input voltage of the low voltage power supply circuit in a case that the low voltage battery has power supply abnormity,
   wherein the low voltage power supply circuit comprises a low voltage power supply, and the output terminal of the high voltage isolation power supply is further connected to a power supply terminal of a drive circuit in the electric vehicle drive system, wherein the drive circuit is configured to amplify a drive signal from a controller of the electric vehicle drive system and output the amplified drive signal to an inverter of the electric vehicle to control the inverter to operate.

7. The device according to claim 6, wherein the high-low voltage power supply switching circuitry is further configured to determine a voltage of the low voltage battery to be the input voltage in a case that the high voltage isolation power supply has power supply abnormity.

8. The device according to claim 6, wherein the high-low voltage power supply switching circuitry is further configured to determine a voltage of the low voltage battery to be the input voltage in a case that the high voltage isolation power supply and the low voltage battery both supply power normally.

9. The device according to claim 8, wherein the high-low voltage power supply switching circuitry comprises two diodes, anodes of the two diodes function as two input terminals of the high-low voltage power supply switching circuitry and are respectively connected to the output terminal of the high voltage isolation power supply and a positive electrode of the low voltage battery, cathodes of the two diodes are connected to each other, and a connection point of the cathodes of the two diodes functions as the output terminal of the high-low voltage power supply switching circuitry.

10. The device according to claim 6, wherein the high-low voltage power supply switching circuitry is further connected to a receiving terminal of the controller of the electric vehicle drive system through a transmitting terminal of the high-low voltage power supply switching circuitry.

11. The device according to claim 10, wherein the high-low voltage power supply switching circuitry is further configured to output abnormal status feedback information of the low voltage battery and/or the high voltage isolation power supply to the controller.

12. An electric vehicle drive system, comprising: a controller, a drive circuit, a low voltage battery, a low voltage power supply circuit, and a backup power supply device for an electric vehicle drive system, the backup power supply device comprising a high voltage isolation power supply and a high-low voltage power supply switching circuitry, wherein:
   an input terminal of the high voltage isolation power supply is connected to a high voltage DC bus of an electric vehicle, an output terminal of the high voltage isolation power supply is connected to an input terminal of the high-low voltage power supply switching circuitry, and the high voltage isolation power supply is configured to: convert a voltage on the high voltage DC bus into a backup input voltage, and output the backup input voltage to the high-low voltage power supply switching circuitry;
   another input terminal of the high-low voltage power supply switching circuitry is connected to an output terminal of a low voltage battery in the electric vehicle drive system, an output terminal of the high-low voltage power supply switching circuitry is connected to an input terminal of a low voltage power supply circuit in the electric vehicle drive system, and the high-low voltage power supply switching circuitry is configured to determine the backup input voltage to be an input voltage of the low voltage power supply circuit in a case that the low voltage battery has power supply abnormity;
   an output terminal of the controller is connected to an input terminal of the drive circuit, and the controller is configured to output a drive signal to the input terminal of the drive circuit on receiving a drive command from an operator; and an output terminal of the drive circuit functions as an output terminal of the electric vehicle drive system, and is connected to a control terminal of an inverter of the electric vehicle, and the drive circuit is configured to: amplify the drive signal, and output the amplified drive signal to the inverter to control the inverter to operate.

13. The system according to claim 12, wherein the controller is further configured to control, through the drive circuit, the inverter to be in an active short circuit state in a case that the electric vehicle is in a towed state or a taxiing state.

14. The system according to claim 12, wherein the controller is further configured to send received abnormal status feedback information to a vehicle controller through a controller area network (CAN).

15. The system according to claim 12, wherein the low voltage power supply circuit comprises a low voltage power supply, or the low voltage power supply circuit comprises a low voltage power supply and a drive isolation power supply, an input terminal of the low voltage power supply functions as an input terminal of the low voltage power supply circuit, and an output terminal of the low voltage power supply is connected to a power supply terminal of the controller.

16. The system according to claim 15, further comprising: a communications circuit, a resolver excitation processing circuit, and a signal processing circuit, wherein the output terminal of the low voltage power supply is connected to a power supply terminal of the communications circuit, a power supply terminal of the resolver excitation processing circuit, and a power supply terminal of the signal processing circuit.

* * * * *